United States Patent [19]

Kenny et al.

[11] Patent Number: 5,348,136
[45] Date of Patent: Sep. 20, 1994

[54] SINGULATION SYSTEM FOR RECYCLABLE MATERIAL

[75] Inventors: Garry R. Kenny, College Grove, Tenn.; Hugh R. Rhys, Woodland Hills, Calif.; Michael A. Skeen, Antioch, Tenn.

[73] Assignee: Magnetic Separation Systems, Inc., Nashville, Tenn.

[21] Appl. No.: 82,270

[22] Filed: Jun. 24, 1993

Related U.S. Application Data

[63] Continuation of Ser. No. 866,882, Apr. 7, 1992, abandoned.

[51] Int. Cl.⁵ .............................................. B65G 47/12
[52] U.S. Cl. .................................... 198/443; 198/493; 198/689.1; 198/803.5
[58] Field of Search ............... 198/380, 396, 443, 453, 198/471.1, 493, 495, 689.1, 803.5

[56] References Cited

U.S. PATENT DOCUMENTS

| | | | |
|---|---|---|---|
| 3,285,387 | 11/1966 | Ochs | 198/689.1 |
| 3,722,665 | 3/1973 | Probasco | 198/689.1 |
| 3,854,567 | 12/1974 | Poupin et al. | 198/689.1 |
| 3,889,801 | 6/1975 | Boyer | 198/689.1 |
| 4,741,428 | 5/1988 | Taniguchi | 198/453 |

*Primary Examiner*—Joseph E. Valenza
*Attorney, Agent, or Firm*—Edward D. Lanquist, Jr.; Mark J. Patterson

[57] ABSTRACT

The present invention discloses a singulation system for recyclable materials which has a vacuum chamber having a slot down the middle. The vacuum chamber is substantially hollow such that air being pulled through one side of the vacuum chamber is pulled through the slot. Air is pulled through the vacuum chamber using a vacuum. A belt is rolled around the vacuum chamber, and the belt has hole arrays. The vacuum pulling air through the slot pulls air through the hole arrays, thereby allowing the belt to grab hold of and pull containers up the belt. Various outlet hoses can be provided from the vacuum to blow containers off the belt which are not firmly attached at the hole arrays, or to blow air against the diverter which then blows air across the belt, or to blow air through the hole arrays on the underside of the vacuum chamber to clear out holes which may be clogged from time to time.

12 Claims, 3 Drawing Sheets ered (...) 5,348,136

SINGULATION SYSTEM FOR RECYCLABLE MATERIAL

This is a continuation of U.S. patent application Ser. No. 866,882 filed Apr. 7, 1992 for "Singulation System for Recyclable Material" now abandoned.

BACKGROUND OF THE INVENTION

The present invention relates generally to a singulation system for recyclable material and more specifically to a device which takes a quantity of recyclable material and places each item individually on a conveyor or chute or other transportation means.

It will be appreciated by those skilled in the art that recycling materials is very popular, given the need for energy and land conservation. It will further be appreciated by those skilled in the art that different types of materials are recycled in different manners. Therefore, these materials must be sorted by type. Certain materials, such as ferrous metals, can be sorted by type using a magnet. Other sorts can be made based on a material property, such as the electrical conductivity of metals, by using an eddy current type sensor. Magnetic and eddy current sensing can detect and be used to remove a specific material type from a collection of different types of materials. Other materials, such as plastic containers, however may be constructed of a variety of plastic polymer types. The majority part of the container may be made from PET, while the base of the container is covered with an HDPE cup. Additionally the closure may be made of aluminum or another plastic polymer type. Determining the majority constituent of a plastic container then requires that each container be examined in detail, such as by making numerous measurements of the entire container with electromagnetic radiation sensors. In order for these determining sensors to work at their most efficient, the plastic container must pass through or go over these sensors or other devices one at a time, to avoid confusion from other plastic types in close proximity. Unfortunately, plastic containers are generally collected in one spot in large groups and then placed into a recycling system in large groups. For example, plastic containers are usually sent to recycling center in large bales.

In the past, sorting of plastic containers has been done by using some type of human sorting system. Humans remove the plastic container by type from a conveyor belt one at a time.

Until now, singulation has been developed only for objects of very similar sizes and shapes, such as positioning of steel, glass or aluminum containers on a filling process line. Other devices have been developed to orient screws and bolts for filling containers or further processing. These devices, however, are also designed to work only with objects of similar sizes and shapes.

What is needed, then, is a device for singulating recyclable materials such as plastic container which vary widely in size and shape. Additionally, the plastic containers may be received in relatively whole condition or in flattened condition in bales form. The singulating device must be able to handle plastic containers of these widely varying sizes, shapes and conditions, and must be economically feasible and efficient. This device must be simple to operate. This device must be usable with an entire recyclable system. This device is presently lacking in the prior art.

SUMMARY OF THE INVENTION

In the present device, a vacuum chamber is provided in an elongated and substantially flat piece of material which has a slot in it. The vacuum chamber pulls air through this slot. At each end of the vacuum chamber, there is provided a roller. Over the rollers, there is placed a belt. This belt has hole arrays each having several holes. The vacuum chamber pulls air through the slot and through the holes in the belt. The belt is placed at an angle from true horizontal such that no material would be grasped by the belt except for the vacuum chamber. The combination of the vacuum chamber through the slot and through the holes in the belt create negative pressure which in essence hold the recyclable material against the belt. The group of holes which comprise each hole assembly is made substantially smaller than the smallest material size to be singulated. This leads to single pieces of recyclable material being pulled up the belt on each group of materials such as to singulate the recyclable materials. The outlet for the vacuum can be used to clear out the holes as the belt passes on the bottom side of the vacuum chamber away from the vacuum slot and can also be blown across the belt to prevent a recyclable container which is being held against the belt from carrying another piece of recyclable material up the belt. In addition air from a nozzle may be directed along the direction of belt travel from the bottom roller to aid the orientation of material to be singulated as it is feed to the bottom of the singulating belt.

Accordingly, one object of the present invention is to provide a singulation system for recyclable materials.

Still another object of the present invention is to provide an economic and efficient singulation method.

Still another object of the present invention is to provide a method which is simple and effective.

Still another object of the present invention is to provide a system which is usable with an entire recycling system.

DESCRIPTION OF THE PREFERRED EMBODIMENT

Figure 1:
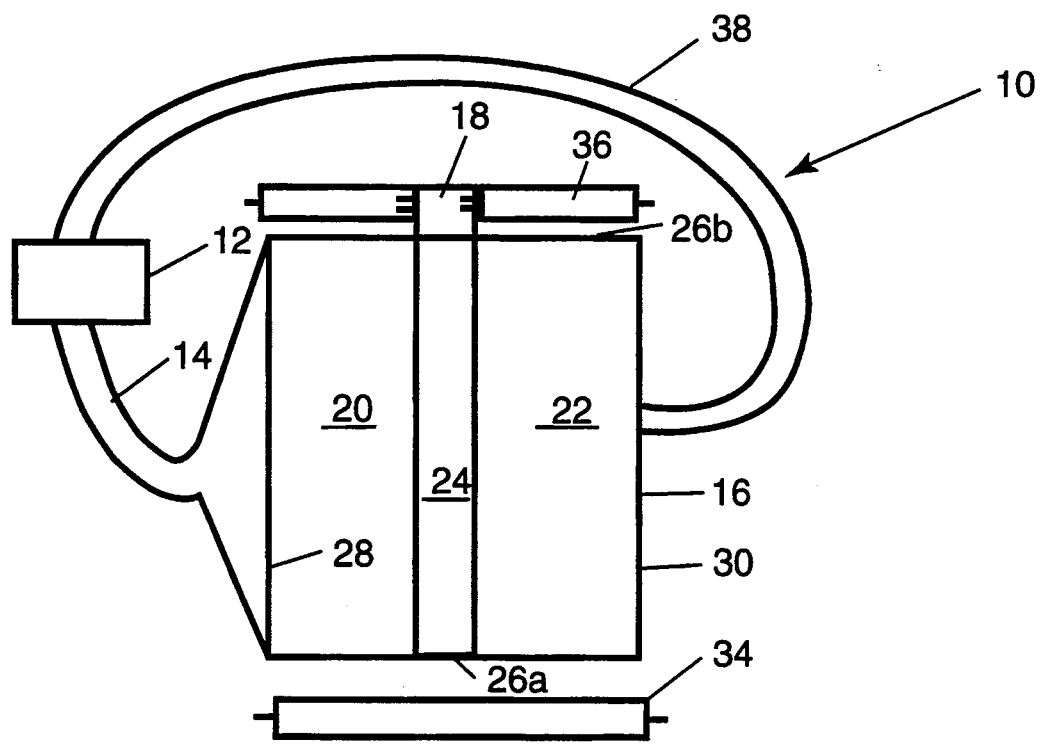
FIG. 1 is a plan view of the device with the belt removed.
Figure 2:
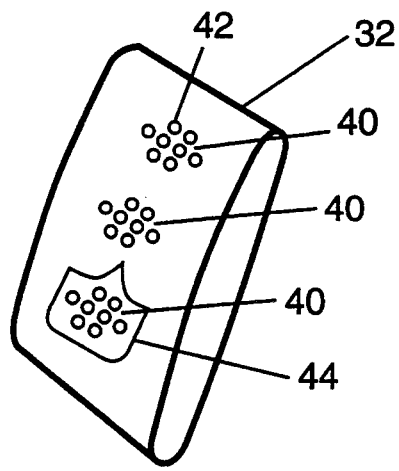
FIG. 2 is a perspective view of just the belt.

Referring now to FIG. 1, there is shown generally at 10 the singulation system of the present invention. Vacuum 12 pulls the system through inlet hose 14. Vacuum chamber 16 is a substantially elongated piece of what is, in the preferred embodiment, a flat material which has slot 18. Vacuum chamber 16 has first face 20, second face 22, and base 24 which extends on bottom of slot 18 as well as below first face 20 and second face 22. Ends 26a, 26b are enclosed; whereas, first side 28 is open and second side 30 can be slightly open or closed, depending upon which embodiment is used. Belt 32 in FIG. 2 is placed over first rollers 34 and second rollers 36. Rollers 34, 36 are of the same diameter in order to move belt 32 over vacuum chamber 16. System 10 can also be provided with outlet hose 38 which can direct outflowing air across belt 32 in FIG. 2.

Referring now to FIG. 2, there is shown a perspective view of belt 32. Belt 32 has hole arrays 40 spaced apart. Hole arrays 40 are made of holes 42 which can be placed in any type of alignment.

Referring now to FIGS. 1 and 2, as vacuum 12 pulls air through inlet hose 14 and between face 20 and base 24, air is pulled through slot 18. Hole arrays 40 are aligned to fit over slot 24 such that the slot creates negative pressure against belt 32, which pulls belt 32 proximate to vacuum chamber 16. As containers 44 contact belt 32, container 44 will only be pulled along belt 32 at point of hole array 40. Outlet hose 38 directs outlet from vacuum 12 across belt 32 so as to cause containers 44 which may be carried along belt 32 by another container 40 when the carried container is not being carried along by hole array 40 to be blown to the side and brought back to the bottom of the belt for pick up at hole array 40. In addition, air from air outlet 39 may be directed through nozzle 39A to aid material to be singulated in their transition from input means 48 to belt 32. Air from nozzle 38A is directed slightly upward with respect to input means 48 such that the front portion of material is lifted slightly to match the angle of belt 32 presenting the object to hole arrays 40 such that they are readily captured.

Figure 3:
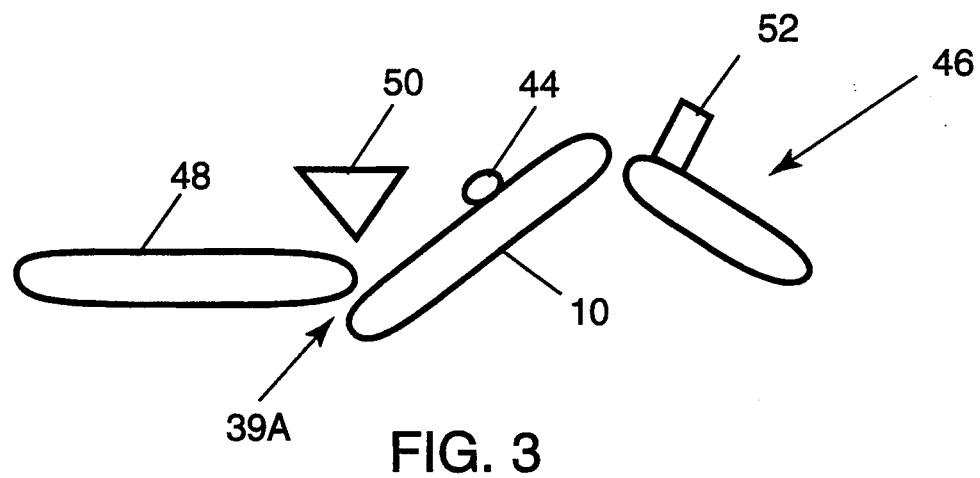
FIG. 3 is a side view of the singulator system as part of a small recycling system.

Referring now to FIG. 3, there is shown generally at 46 a simple recycling system. Singulation system 10 receives containers 44 from feed conveyor 48. Baffle 50 is used to decrease the amount of containers 44 which are placed on singulation system 10 at one time. After containers are moved along singulation system 10 and placed singly, containers 44 are transported to another conveyor, chute, or other transportation device which is, in this particular embodiment, through sensor 52 and down off bearing conveyor 54. In order to ensure that conveyor 32 only pulls along containers 44 at hole arrays 40, singulation system is placed at substantially a 45 to 60 degree angle from horizontal. However, this can be at any angle such that the coefficient of friction between container 44 and belt 32 is low, thereby preventing belt 32 from pulling container 44 up belt.

In the preferred embodiment, a 14 inches of water vacuum is used. However, any vacuum can be used to generate 10 to 30 inches of water in pressure. Rollers 34, 36 can be rotated by any means such as a chain drive or direct shaft from a motor. In the preferred embodiment, holes 42 are substantially ⅛ inch to ⅜ inch in diameter, and hole arrays 40 are substantially 1 inch to 3 inches in diameter, because containers 44 tend to be 4 inches to 10 inches in typical width. In the preferred embodiment, belt 32 moves at substantially 100 to 360 feet per minute.

Figure 4:
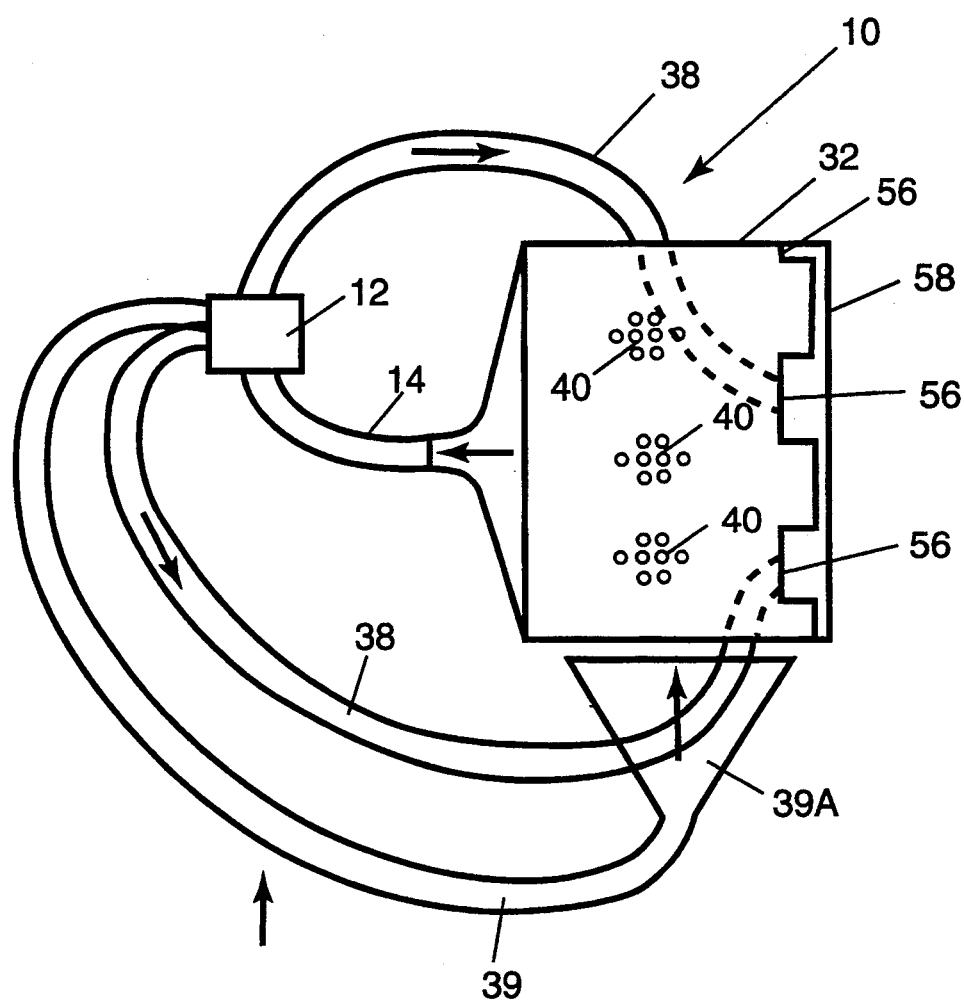
FIG. 4 is a plan view of the belt showing the diverter.

Referring now to FIG. 4, there is shown generally at 10 another embodiment of the present invention. In this particular embodiment, vacuum 12 pulls air through inlet hose 14 to create negative pressure under hole arrays 40 as described in reference to FIGS. 1 and 2. However, in this particular embodiment, cut outs 56 are provided in belt 32. Outlet hose or hoses 38 direct air from vacuum 12 against diverter 58 which can extend above the plane formed by belt 32. This air blowing against diverter 56 comes back across the top of belt 32 at substantially 1000 to 3000 feet per minute in the preferred embodiment to blow any containers 44 which are not on hole arrays 40 off of belt 32.

Figure 5:
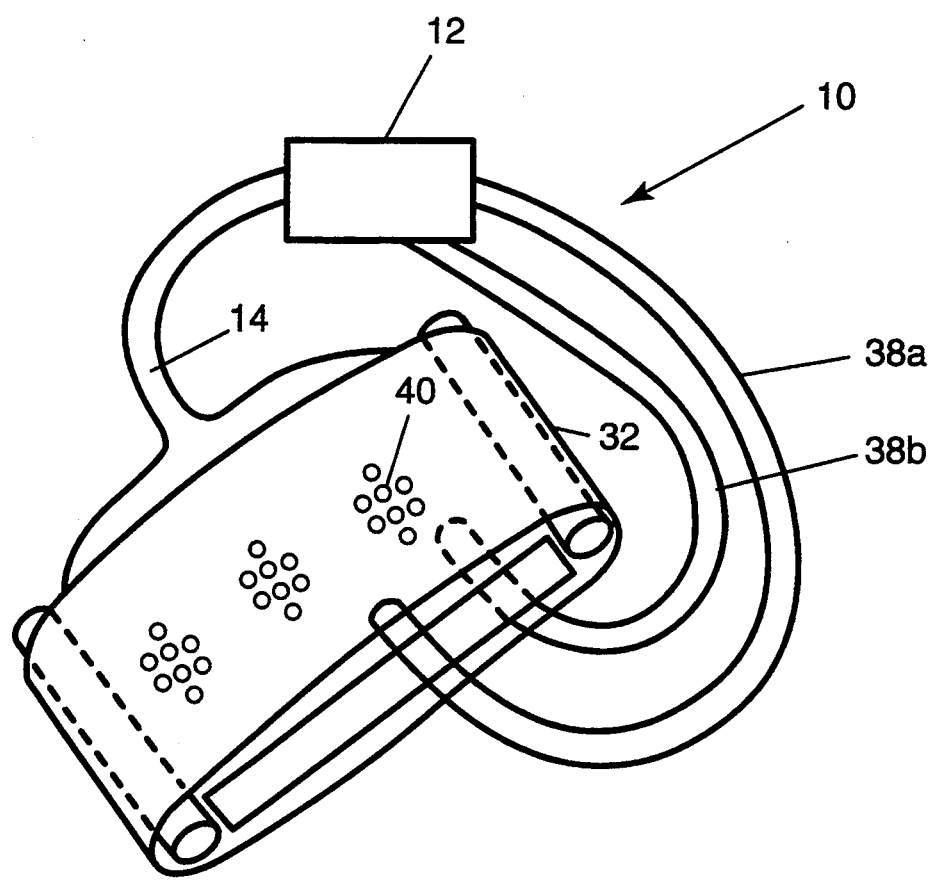
FIG. 5 is a perspective view of the singulator system showing the vacuum with both inlets and outlets.

Referring now to FIG. 5, there is shown still another embodiment of device 10. Vacuum 12 pulls air through inlet hose 14. Outlet hoses 38 receive outlet from vacuum 12. Outlet hose 38a forces outlet across face of belt 32 to blow containers 44 which are not on hole arrays 40. Outlet hose 38b is directed to underside of belt 32 and through hole arrays 40 to clean hole arrays 40 which at times may become clogged.

Air from outlet hoses 38 is directed at substantially 1000 to 3000 feet per minute. However, any particular velocity can be used as long as it is sufficient for the purpose of either dislodging materials from hole arrays 40 or moving containers 44 off belt 32.

Besides vacuum, air to force containers from belt can be created by an air nozzle which assists in the orientation of the containers making the transition from the input conveyor to the singulation system. Further, cross blowing air can provided by pulsed air valves supplied by compressed air and actuated by an optical sensor triggered by markings on the singulation belt.

Thus, although there have been described particular embodiments of the present invention of a new and useful singulation system for recyclable material, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A system for singulating containers varying in size comprising:
   a. a vacuum chamber;
   b. means for pulling air through said vacuum chamber comprising a vacuum and an inlet hose connecting said vacuum to said vacuum chamber;
   c. a continuous belt passing across said vacuum chamber, said belt having a hole array arranged to engage on container; and
   d. an outlet hose attached to said vacuum for blowing air across said belt.

2. The device of claim 1 further comprising a diverter attached proximate to said second side of said vacuum chamber 3. The device of claim 2 wherein said belt has a cutaway proximate to said diverter.

4. The device of claim 1 further comprising said vacuum chamber further comprising a diverter.

5. The device of claim 4 wherein said belt has a cutaway proximate to said diverter.

6. A system for singulating recyclable materials comprising:
   a. a vacuum chamber having a first face, a second face, a base, a first side, a second side, and a slot between said first face and said second face;
   b. a vacuum;
   c. an inlet hose connecting said vacuum to said vacuum chamber proximate to said first side of said vacuum chamber;
   d. a roller placed proximate to each of the ends of said vacuum chamber;
   e. a continuous belt placed around and moved by said rollers across said vacuum chamber such that said belt runs substantially parallel to said slots, said belt having a hole array aligned over said slot for engaging one container; and
   f. an outlet hose connected to an air source for blowing air across said belt.

7. A system for singulating recyclable materials comprising:
 a. a vacuum chamber having a first face, a second face, a base, a first side, a second side, and a slot between said first face and said second face;
 b. a vacuum:
 c. an inlet hose connecting said vacuum to said vacuum chamber proximate to said first side of said vacuum chamber;
 d. a roller placed proximate to each of the ends of said vacuum chamber;
 e. a continuous belt placed around and moved by said rollers across said vacuum chamber such that said belt runs substantially parallel to said slot, said belt having a hole array aligned over said slot for engaging one container; and
 f. an outlet hose attached to said vacuum for directing air across said belt.

8. A system for singulating recyclable materials comprising:
 a. a vacuum chamber having a first face, a second face, a base, a first side, a second side, and a slot between said first face and said second face;
 b. a vacuum;
 c. an inlet hose connecting said vacuum to said vacuum chamber proximate to said first side of said vacuum chamber;
 d. a roller placed proximate to each of the ends of said vacuum chamber;
 e. a continuous belt placed around and moved by said rollers across said vacuum chamber such that said belt runs substantially parallel to said slot, said belt having a hole array aligned over said slot for engaging one container;
 f. a diverter attached proximate to said second side of said vacuum chamber; and
 g. an outlet hose for directing air against said diverter and thus across said belt.

9. A singulation system for recyclable materials comprising
 a. a vacuum chamber having a first face, a second face, a base, a first side, a second side, and a slot between said first face and said second face;
 b. a vacuum;
 c. an inlet hose connecting said vacuum to said vacuum chamber proximate to said first side of said vacuum chamber;
 d. a roller placed proximate to each of the ends of said vacuum chamber;
 e. a continuous belt placed around and moved by said rollers across said vacuum chamber such that said belt runs substantially parallel to said slot, said belt having a hole array aligned over said slot;
 f. an outlet hose attached to said vacuum for directing air across said belt;
 g. a diverter attached proximate to said second side of said vacuum chamber;
 h. an outlet hose for directing air against said diverter and thus across said belt; and
 i. said belt has a cutaway proximate to said diverter.

10. A system for singulating recyclable materials comprising:
 a. a vacuum chamber having a first face, a second face, a base, a first side, a second side, and a slot between said first face and said second face;
 b. a vacuum;
 c. an inlet hose connecting said vacuum to said vacuum chamber proximate to said first side of said vacuum chamber;
 d. a roller placed proximate to each of the ends of said vacuum chamber;
 e. a continuous belt placed around and moved by said rollers across said vacuum chamber such that said belt runs substantially parallel to said slot, said belt having a hole array aligned over said slot for engaging one container; and
 f. an outlet hose attached to said vacuum for directing air through said hole arrays of said belt proximate to said base.

11. The device of claim 6 further comprising an air nozzle for directing said containers off said belt.

12. The device of claim 6 comprising an outlet hose attached to a pulsed air valve for directing air through said hole arrays of said belt proximate to said base.

* * * * *